Oct. 15, 1963     L. J. LOGAN     3,106,947
MATERIAL FEEDING APPARATUS

Filed Aug. 18, 1961     2 Sheets-Sheet 1

INVENTOR.
LEWIS J. LOGAN
BY
Woodling, Krost, Granger Rust
Attys.

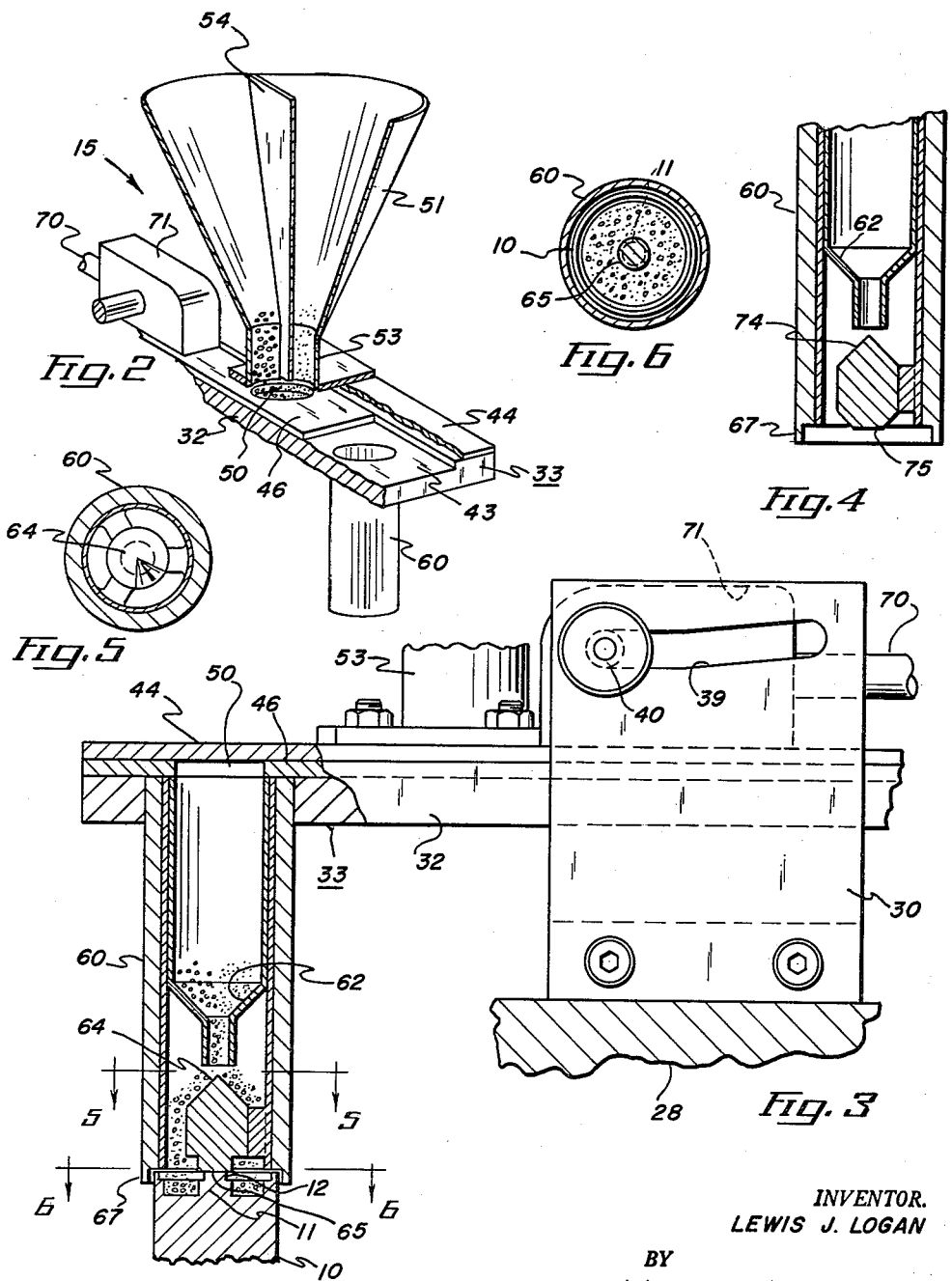

United States Patent Office 3,106,947
Patented Oct. 15, 1963

3,106,947
MATERIAL FEEDING APPARATUS
Lewis J. Logan, 11820 Edgewood Drive, Lakewood, Ohio
Filed Aug. 18, 1961, Ser. No. 132,382
9 Claims. (Cl. 141—107)

The present invention relates in general to material feeding apparatus and more particularly to such apparatus wherein a predetermined quantity of material can be conveniently transferred from a storage bin or area to a place where it is to be ultimately used.

An object of the present invention is to provide a material feeding device wherein a predetermined volume of material can be conveniently transferred from one position to another.

Another object of the present invention is to provide a material feeding apparatus which has a convenient means of moving into and out of position relative to a member to which the material is being transferred.

Another object of the present invention is to provide a material feeding apparatus which includes a slide member with an opening therein movable between first and second positions with the first position registering the opening in the slide member with a material hopper and with the second position being in register with a material transfer tube or chute which transports the material to the place where it will be utilized.

Another object of the present invention is to provide a material feeding apparatus which is capable of measuring and mixing two or more materials which are to be transported from one place to another.

Another object of the present invention is to provide a material feeding apparatus which is reliable in transporting material from one place to another, and which keeps material from a predetermined area or position.

Another object of the present invention is to provide a convenient means and method for introducing a predetermined amount of a welding flux into a cavity in the end of a welding stud without depositing the flux on a shoulder which forms a part of the central post of the welding stud.

Other objects and a fuller understanding of this invention may be had by referring to the following description and claims, taken in conjunction with the accompanying drawings, in which:

FIGURE 2 is an isometric view of a portion of the apparatus shown in FIGURE 1 with parts thereof broken away so that a convenient understanding of the workings of the mechanism can be had;

FIGURE 3 is a side elevational view partially in section of the apparatus taken from the right side of the view of FIGURE 1;

FIGURE 4 is a fragmentary view showing a modification of the transfer tube of the apparatus shown in FIGURES 1, 2 and 3;

FIGURE 5 is a view taken generally along the line 5—5 of FIGURE 3; and

FIGURE 6 is a view taken generally along the line 6—6 of FIGURE 3.

Figure 1:
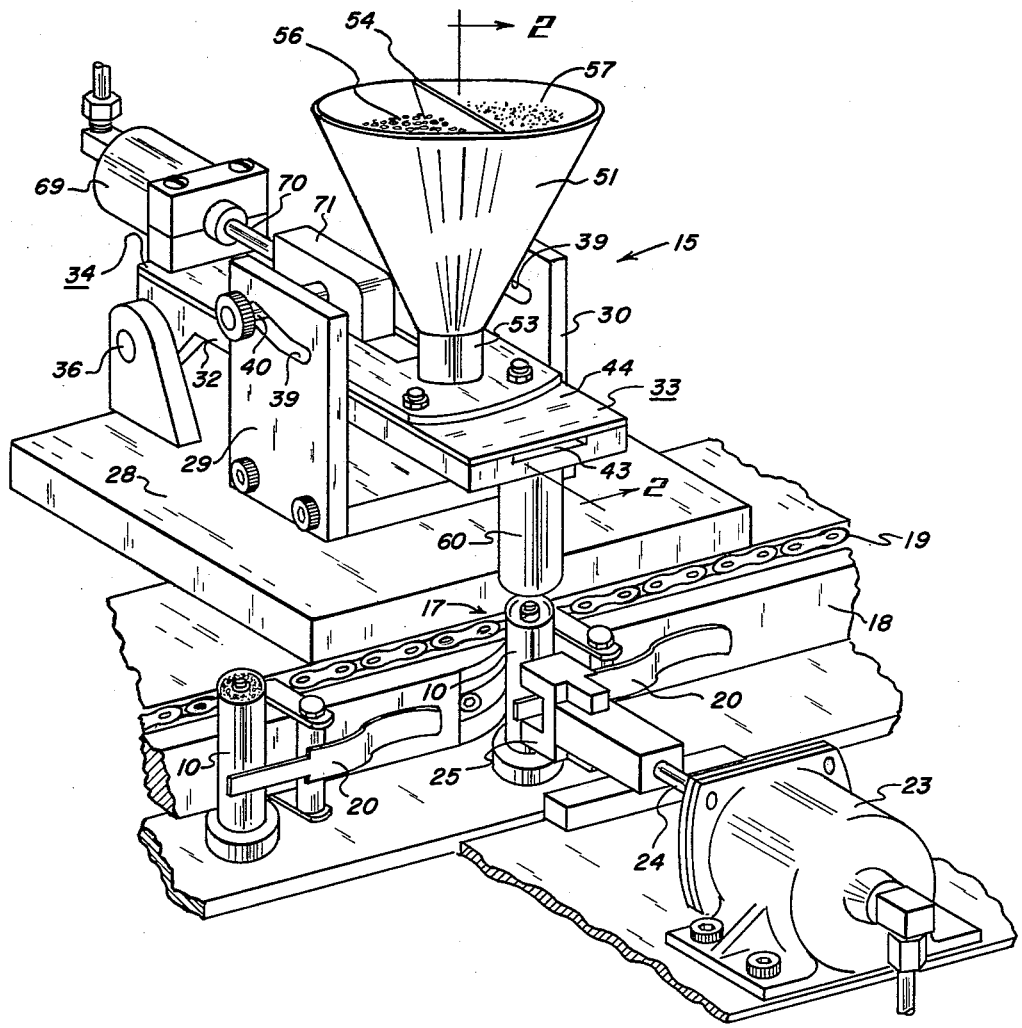
FIGURE 1 is an isometric view of the apparatus of the present invention shown in combination with a conveyor system for transporting welding studs to a loading position relative to the apparatus.

The material feeding apparatus of the present invention has been specifically adapted for introducing a welding flux into a cavity in the end of a welding stud 10 which welding stud is provided with a central post 11 having a shoulder 12 thereon. It will be readily appreciated by those skilled in the art that the present apparatus is susceptible of a larger range of uses than the specific one just herein above described. As a result, the specific adaptation of introducing a welding flux into the cavity of a welding stud has been utilized primarily from the standpoint of showing an embodiment of the invention, and the scope of the inventive contribution should be determined by reference to the claims.

The material feeding apparatus illustrated in the drawings has been indicated generally by the reference numeral 15 and welding studs 10 are transported to a loading position 17 by means of a conveyor which comprises a support member 18 and a chain 19 which is adapted to move relative thereto and which carries holding members 20 which secure the welding studs and transport them along the front face of the support member 18. The conveyor is driven by a suitable means which has not been shown which indexes each of the holding members to a position adjacent the loading position 17. The welding stud at the loading position is securely held in a generally vertical position by means which include an air cylinder 23 having a piston movable therein and a piston rod 24 connected to a yoke shaped engagement member 25. Actuation of the air cylinder 23 causes the engagement member 25 to engage the welding stud and firmly hold it in position during the feeding or loading operation.

The material feeding apparatus 15 includes a base 28 which has mounted thereon first and second spaced and upwardly extending mounting walls 29 and 30 respectively. A mounting plate 32 is provided which has first and second end portions 33 and 34 respectively and pivot means 36 serve to pivotally mount the second end portion 34 of the mounting plate to the base. A cam mechanism is provided for connecting the first end portion 33 of the mounting plate to the mounting walls 29 and 30 and is for the purpose of providing limited up and down movement of the first end portion 33 of the mounting plate about the pivot means 36. The cam mechanism includes generally cam slots 39 in each of the mounting walls 29 and 30 and cam followers 40 are located in the slots and in their movement therein, cause up and down movement of the first end portion 33 of the mounting plate 32.

Wall means are provided in the mounting plate 32 and serve to form a generally rectangularly shaped guideway 43 which in part is formed by a cover plate 44. A slide member 46 is positioned in the guideway 43 and is adapted for back and forth movement in the guideway. The first position of the slide member is shown in FIGURE 2 and the second position of the slide member has been indicated in FIGURE 3. Wall means 50 are provided in the slide member 46 and define a circular opening completely through the slide member. Positioned on top of the cover plate 44 which is located on the mounting plate 32 is a funnel type storage member 51. The lower portion of the funnel type storage member 51 comprises a conduit 53 which is, as will be noted in FIGURE 2, in communication with the guideway 43. A partition 54 is located in the funnel type storage member 51 and extends vertically through the storage member and through the conduit. This serves to separate the two materials which constitute the welding flux in this particular embodiment, with aluminum particles being positioned on one side and iron particles on the other. When the slide member 46 is in the first position as shown in FIGURE 2, the circular opening 50 is in register with the conduit 53. In this instance, a quantity of flux material will be introduced into the circular opening 50 in the slide member which is the same in volume as the volume of the cylindrical cavity in the slide member.

A transfer tube 60 is mounted on the lower side of the mounting plate at the outer end thereof, and as will be noted in FIGURE 3, is in communication with the guideway 43 and is also in communication with the circular opening of the slide member when the slide member is in its second position. The interior of the transfer tube or the second conduit as it is sometimes referred to, is constructed in the nature of funnel means 62 which serve to direct the material which is received from the opening in the slide member toward the center of the transfer tube. A cone shaped diffuser member 64 is positioned immediately below the funnel means 62 with the cone portion immediately adjacent the opening in the funnel means and the lower end of the diffuser member is provided with a generally flat surface 65. As will be noted the lower peripheral edge or end 67 is adapted to immediately surround the outer periphery of the welding stud 10. This is in the down or lower position of the transfer tube. Also in this position it will be noted that the flat surface 65 of the diffuser member 64 is in contact with the upper edge of the central post 11 and also hangs over the central post 11 far enough to cover the shoulder 12. This serves to prevent welding flux which is transported to the cavity in the welding stud from ending up on the shoulder 12 or on the top surface of the central post 11.

Mounted on the second end portion 34 of the mounting plate 32 is an air cylinder 69 and located in the air cylinder is the usual piston (not shown) which has a piston rod 70 extending therefrom, and secured to the end of the piston rod is a connecting block 71 which is adapted to move in accordance with the movement of the air cylinder piston. It will also be observed that the connecting block 71 is secured to the slide member 46 and it will, therefore, be apparent that the movement of the connecting block 71 causes movement of the slide member 46. The cam followers 40 are integrally connected to the connecting block 71 and are also caused to move in accordance with the movement of the connecting block. It, therefore, can be said that the actuation of the air cylinder 69 causes corresponding movement of the connecting block 71 along with movement of the slide member 46 and the cam followers 40.

The operation of the apparatus is generally as follows. A welding stud 10 is indexed into a loading position 17 by means of the conveyor and is held in position by means of the yoke shaped engagement member 25. The funnel type storage member 51, of course, has prior to this time been loaded with the aluminum particles 56 and iron particles 57 which in this particular embodiment make up the welding flux which is used herein. Upon a predetermined signal the air cylinder 69 is actuated causing movement from the position of the parts as shown in FIGURES 1 and 2. With the slide member in the first position as shown in FIGURE 2, a quantity of welding flux is caused by gravity to move into the circular opening 50 of the slide member 46. Upon actuation of the air cylinder 69 the connecting block 71 is moved outwardly toward the conveyor. This causes movement of the cam followers 40 in the cam slots 39 which causes a downward movement of the first end portion 33 of the mounting plate about the pivot means 36 from the position shown in FIGURE 1 to the position shown in FIGURE 3. This locates the lower end of the transfer tube 60 relative to the welding stud 10 which is held at the loading position 17. At the same time the forward movement of the connecting block 71 causes the circular opening 50 in the slide member to move to the position in FIGURE 3 in register with the transfer tube 60. When this happens the slug of welding flux carried in the circular opening is dumped into the transfer tube at which time it travels by gravity down the funnel means 62 and impinges on the cone shaped diffuser member 64. The diffuser member serves to intimately mix the aluminum and iron particles so that the welding stud in its later use will be more effective. After this operation has been completed, the piston in the air cylinder 69 is retracted with resultant movement of the parts from the position shown in FIGURE 3 back to the position shown in FIGURES 1 and 2 at which time the cycle is ready to be repeated. FIGURE 4 illustrates a modification of the diffuser member shown in FIGURE 3. In this view the diffuser is indicated by the reference numeral 74 and the flat surface 75 is connected by sloping walls to the sides.

As a result of the construction which has been described hereinabove, it will be readily apparent to those skilled in the art that a convenient means has been provided for transferring a predetermined quantity of material from a storage area to a place where it is to be ultimately used. It will also be apparent that the other objects of the invention are carried out and particularly it will be noted that the apparatus is capable of conveniently transferring two or more materials from one position to another while providing good mixing of the same.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for introducing welding flux into a cavity in the end of a welding stud having a central post with a shoulder thereon including in combination means for holding a stud in a generally vertical position, a base having first and second spaced and upwardly extending mounting walls, a mounting plate having first and second end portions, pivot means pivotally mounting said second end portion of said mounting plate to said base, a cam mechanism connecting said first end portion of said mounting plate to said mounting walls for pivoting said mounting plate about said pivot means, said cam mechanism including cam slots in each of said first and second mounting walls and cam followers movable therein, wall means defining a rectangularly shaped guideway in said mounting plate, a slide member movable between first and second positions in said guideway, wall means defining a circular opening through said slide member, a funnel type storage member mounted on top of said mounting plate and being in communication with said circular opening in said first position of said slide member, wall means dividing said storage member into at least two vertically extending chambers, a transfer tube mounted on the lower side of said mounting plate and being in communication with said circular opening in said second position of said slide member, funnel means in said transfer tube having a central opening, a cone shaped diffuser member mounted in said transfer tube immediately below said central opening in said funnel means, the lower end of said transfer tube being adapted to surround a welding stud with a lower end of said diffuser member adapted to cover the central post and shoulder of the welding stud to prevent welding flux from being deposited thereon, an air cylinder mounted on said second end portion of said mounting plate, a piston in said air cylinder and having a piston rod connected thereto for movement between first and second positions, a connecting block fixed to said piston rod, said cam followers carried by said connecting block, said slide member connected to said connecting block and movable therewith, movement of said connecting block from said first to said second position causing said circular opening in said slide member to carry welding flux to said transfer tube and at the same time said cam mechanism causes movement of said mounting plate about said pivot means to move said lower end of said transfer tube into position relative to the welding stud.

2. Apparatus for introducing welding flux into a cavity in the end of a welding stud having a central post including in combination means for holding a stud, a base having first and second spaced mounting walls, a mounting plate having first and second end portions, pivot means pivotally mounting said second end portion of said mounting plate to said base, a cam mechanism connecting said first end portion of said mounting plate to said mounting walls for pivoting said mounting plate about said pivot means, said cam mechanism including cam slots in each of said first and second mounting walls and cam followers movable therein, wall means defining a guideway in said mounting plate, a slide member movable between first and second positions in said guideway, wall means defining an opening through said slide member, a storage member mounted on top of said mounting plate and being in communication with said opening in said first position of said slide member, a transfer tube mounted on the lower side of said mounting plate and being in communication with said opening in said second position of said slide member, a diffuser member mounted in said transfer tube, the lower end of said transfer tube being adapted to surround a welding stud with a lower end of said diffuser member adapted to cover the central post of the welding stud to prevent welding flux from being deposited thereon, a cylinder mounted on said second end portion of said mounting plate, a piston in said cylinder and having a piston rod connected thereto for movement between first and second positions, a connecting block connected to said piston rod, said cam followers carried by said connecting block, said slide member connected to said connecting block and movable therewith, movement of said connecting block from said first to said second position causing said opening in said slide member to carry welding flux to said transfer tube and at the same time said cam mechanism causes movement of said mounting plate about said pivot means to move said lower end of said transfer tube into position relative to the welding stud.

3. Apparatus for introducing welding flux into a cavity in the end of a welding stud including in combination means for holding a stud, a base having first and second mounting walls, a mounting plate having first and second end portions, pivot means pivotally mounting said second end portion of said mounting plate to said base, a cam mechanism connecting said first end portion of said mounting plate to said mounting walls for pivoting said mounting plate about said pivot means, wall means defining a guideway in said mounting plate, a slide member movable between first and second positions in said guideway, wall means defining an opening in said slide member, a storage member being in communication with said opening in said first position of said slide member, a transfer tube mounted on the lower side of said mounting plate and being in communication with said opening in said second position of said slide member, the lower end of said transfer tube being adapted to surround a welding stud, means for moving said cam mechanism and said slide member whereby said opening in said slide member carries welding flux to said transfer tube and said cam mechanism causes movement of said mounting plate about said pivot means to move said lower end of said transfer tube into position relative to the welding stud.

4. A material feeding device including in combination a plate member having first and second end portions, means pivotally mounting said second end portion, cam means for moving said first end portion of said plate member about said pivotal mounting, a guideway in said plate member, a slide member movable between first and second positions in said guideway and having an opening therein, a material hopper in communication with said slide member opening in said first position of said slide member, a transfer tube in communication with said slide member opening in said second position of said slide member, and power means for actuating said cam means to move said first end portion of said plate member about said pivotal mounting and for moving said slide member in said guideway.

5. A material feeding device including in combination a plate member having first and second end portions, means pivotally mounting said second end portion, first means for moving said first end portion of said plate member about said pivotal mounting, a guideway in said plate member, a slide member movable between first and second positions in said guideway and having an opening therein, a material hopper in communication with said slide member opening in said first position of said slide member, a transfer tube in communication with said slide member opening in said second position of said slide member, and second means for actuating said first means to move said first end portion of said plate member about said pivotal mounting and for moving said slide member in said guideway.

6. A material feeding device including in combination a plate member having first and second end portions, means mounting said second end portion, first means for moving said first end portion of said plate member up and down about said mounting, a guideway in said plate member, a slide member movable between first and second positions in said guideway and having an opening therein, a material hopper in communication with said slide member opening in said first position of said slide member, a transfer tube in communication with said slide member opening in said second position of said slide member, and second means for actuating said first means to move said first end portion of said plate member about said mounting.

7. Apparatus for introducing welding flux into a welding stud including in combination means for holding a stud, mounting walls, a mounting plate having first and second end portions, pivot means pivotally mounting said second end portion of said mounting plate, a cam mechanism connecting said first end portion of said mounting plate to said mounting walls for pivoting said mounting plate about said pivot means, wall means defining a guideway in said mounting plate, a slide member movable between first and second positions in said guideway, wall means defining an opening in said slide member, a storage member being in communication with said opening in said first position of said slide member, a transfer tube connected to said mounting plate and being in communication with said opening in said second position of said slide member, the lower end of said transfer tube being positionable adjacent a welding stud, means for moving said cam mechanism and said slide member whereby said opening in said slide member carries welding flux to said transfer tube and said cam mechanism causes movement of said mounting plate about said pivot means to move said lower end of said transfer tube into position relative to a welding stud.

8. Apparatus for introducing welding flux into a welding stud including in combination, a mounting plate having first and second end portions, pivot means pivotally mounting said second end portion of said mounting plate, a cam mechanism for pivoting said mounting plate about said pivot means, wall means defining a guideway in said mounting plate, a slide member movable between first and second positions in said guideway, a storage member being in communication with said guideway, a transfer member connected to said guideway at a position spaced from said storage member, means for moving said cam mechanism and said slide member whereby said slide member carries welding flux to said transfer member and said cam mechanism causes movement of said mounting plate about said pivot means to move said transfer member into position relative to a welding stud, said cam mechanism being such that said mounting plate is pivoted to move said transfer member into position relative to a welding stud before said slide member carrying welding flux arrives at said transfer member.

9. Apparatus for handling a flowable welding material, including in combination, a mounting plate having first and second end portions, means mounting said mounting plate, a cam mechanism connected to said mounting plate to move same between first and second positions, wall means defining a guideway in said mounting plate, a slide member movable between said first and second end portions of said plate in said guideway, a material introducing member being in communication with said guideway, a transfer member connected to said guideway, means for moving said cam mechanism and said slide member whereby said slide member carries welding material to said transfer member and said cam mechanism causes movement of said mounting plate from said first to said second positions to move said transfer member into a desired position, said cam mechanism being such that said mounting plate is moved into desired position before said slide member carrying material arrives at said transfer member.

References Cited in the file of this patent

UNITED STATES PATENTS

| | | |
|---|---|---|
| 1,058,269 | Spurlock | Apr. 8, 1913 |
| 1,107,114 | Rose | Aug. 11, 1914 |
| 1,198,014 | Dun Lany | Sept. 12, 1916 |
| 1,817,550 | Fenn | Aug. 4, 1931 |
| 2,084,029 | Hochstim | June 15, 1937 |
| 2,562,815 | Oscroft | July 31, 1951 |
| 2,808,969 | Moravecky | Oct. 8, 1957 |